Patented July 24, 1934

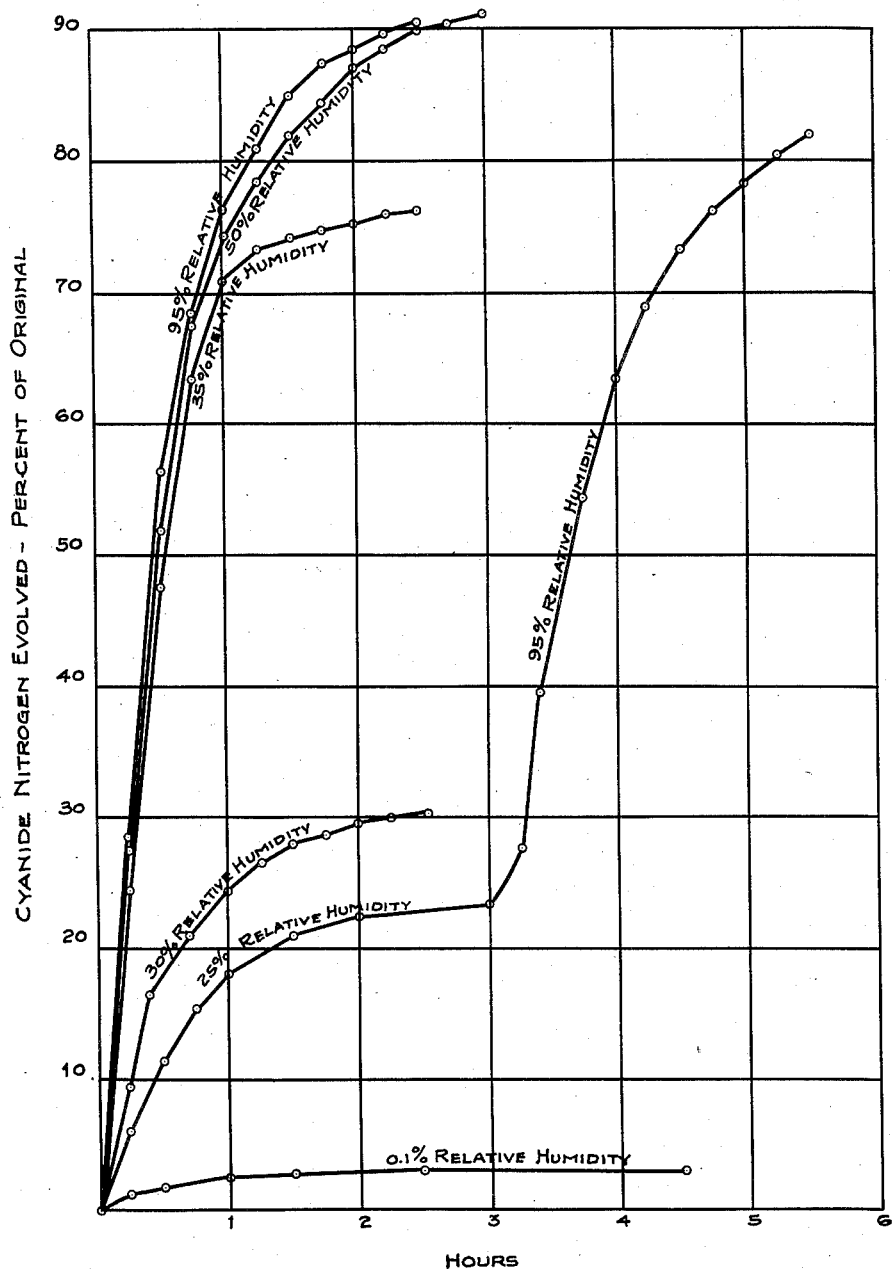

1,967,290

UNITED STATES PATENT OFFICE 1,967,290

FUMIGATING COMPOUND AND METHOD OF FUMIGATING

Kenneth F. Cooper, Great Neck, N. Y., assignor to American Cyanamid Company, New York, N. Y., a corporation of Maine Application June 2, 1924, Serial No. 717,315

9 Claims. (Cl. 167—35)

This invention relates to fumigation and more particularly to a fumigant which is especially adapted for the destruction of animal and insect pests, scale and the like, and to a method of using the same.

This application is a continuation in part of my co-pending application Serial No. 606,530, filed December 12, 1922, for Fumigating compound and method of using same, assigned to the American Cyanamid Company.

Heretofore various materials for fumigating have been proposed and used, among which are the well known lime-sulphur compositions, which are sprayed upon the objects to be treated, whereby the corrosive effect of the compositions causes extermination of the pests. Nicotine sulphate has also been used for this purpose, its effect being produced by the volatilization thereof. Compounds of arsenic, which depend upon the toxic effect thereof on the pests, have also been used to some extent.

It has been found that hydrocyanic acid is one of the most effective means for controlling animal and insect pests because of the poisonous character of the substance, and also because of its gaseous state which allows it to penetrate the space to be fumigated, readily and completely.

The space to be fumigated, if it is a building, is sealed as tightly as possible and the hydrocyanic acid gas is liberated in this space from the reaction of a cyanide, such as sodium cyanide, with an acid, such as sulphuric acid. Another method of utilization of hydrocyanic acid is the production of the acid in liquefied form in suitable containers and then utilizing the same by atomizing or spraying liquid into the space to be fumigated,—the volatilization thereof providing the desired poisonous gas. In the case of trees, plants and other objects which are not ordinarily housed, it is customary to enclose the same in a suitable portable covering, such as a tent, and then to liberate the gas within the enclosure in any suitable manner.

The present invention is an improvement on the methods used heretofore in the application of hydrocyanic acid, it being among the objects thereof to provide a fumigant which is cheap and effective and is safe to handle.

It is another object of my invention to provide a fumigant which is rapid and powerful in its toxic action and which does not leave a poisonous residue.

It is a still further object of my invention to provide a method of fumigating which is simple, which requires no skilled operators and substantially no apparatus in the application thereof.

My invention is based upon the discovery that certain substances, such as some cyanides, are capable in the presence of a suitable amount of water, generally in the form of vapor, of evolving a gas which is highly poisonous. The gas is liberated with a fair degree of rapidity whereby substantially the entire substance is transformed into a non-poisonous material with the liberation of its entire content of poisonous gaseous constituents. More specifically I have discovered that certain cyanides, such as alkali earth cyanides, especially when mixed with other substances, are capable of absorbing water, causing a reaction to take place which liberates hydrocyanic acid by substantially complete decomposition of the cyanide.

In practicing my invention, I utilize a mixture containing an alkali and an alkali earth metal, together with cyanogen and chlorine, generally in the form of salts of the metals and non-metals, the said mixture constituting a crude cyanide of sodium and calcium, which is readily available. I subdivide the material to any suitable degree, making either a fine powder, a mass of granules, or flakes. The material is then distributed into the space to be fumigated, whereupon the action of moisture in the air causes hydrolysis to take place, decomposing the cyanide and giving off poisonous HCN gas. The reaction may be illustrated, assuming that the cyanide in the mixture is in the form of calcium cyanide, by the following equation:

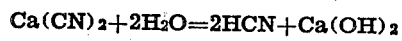

$$Ca(CN)_2 + 2H_2O = 2HCN + Ca(OH)_2$$

The result of this reaction is that hydrocyanic acid is formed by interaction of calcium cyanide and water, the gas escaping and leaving a residue of hydrated lime which is precipitated out. The lime is a weak alkali and since the products of the reaction are separated almost immediately after they are formed, no equilibrium is established and the reaction goes rapidly to completion.

In addition to a cyanide such as described above, I generally prefer to have present a substance which is capable of absorbing water from the air in such a condition as to make it available for a reaction with the cyanide to liberate poison gas. In the mixture which I use, there is contained some calcium chloride which, as is well known, has a great affinity for water and will rapidly absorb the same from the air, even dissolving in the water so absorbed. By reason of the intimate mixture of the hygroscopic calcium chloride with a reactive cyanide, the water absorbed by the chloride is made available to the cyanide for the above reaction. I have found that the speed and completeness of the reaction varies with the humidity of the air and the temperature thereof in a peculiar manner.

In the accompanying drawing, constituting a part hereof, the single figure is a diagram showing the effect of the exposure to moist air at 22° C. of a cyanide powder, all of which passes thru a 40 mesh screen, and which contains about 24% CN and 22% Cl in the form of cyanides and chlorides of sodium and calcium.

The first curve shows the result of the exposure of the material to air having a relative humidity of 95%. It will be noted that in the first hour over 75% of the cyanide reacts with the mixture to give HCN and the reaction is substantially complete in about two and one half hours at which time over 90% of the cyanide is decomposed. The next curve shows the result of exposure of the cyanide to air of 50% relative humidity and indicates that substantially complete decomposition is obtained in approximately the same time as required for air which is substantially saturated with water.

At 35% relative humidity the reaction goes on in the first hour to approximately the same extent at a higher humidity but thereafter shows a falling off, resulting in less final decomposition of the cyanide and, therefore, less efficiency of reaction. At 30% relative humidity the action is comparatively slow and incomplete, showing that at a point intermediate 30% and 35% relative humidity a critical stage is reached at which the efficiency of the reaction decreases very rapidly. It will be noted that at 25% relative humidity the efficiency is still less and at .1%, which is substantially dry air, there is practically no reaction at all.

In order to determine whether exposure of the cyanide to air having relatively low humidity, resulting in very little decomposition of the cyanide, had any effect on the total amount of HCN which could be liberated at higher humidities, the sample which was first exposed to air having 25% relative humidity was then exposed to air having 95% relative humidity, whereupon the decomposition of the cyanide took place at a rate which was substantially the same as the rate of curve 1.

As the result of these experiments, I have determined that the critical humidity for the decomposition of the crude cyanide dust which I used is between 30% and 35% with a maximum at 50% humidity. For the granular and floccular form, the critical humidity is between 35% and 50%.

The efficiency of the reaction is dependent upon the humidity and the size of the granules. At 95% humidity the efficiency is greater than at 50% and, in general, the higher the humidity the greater is the useful decomposition of the cyanide. The amount of HCN evolved is less if the cyanide is in the form of coarser particles. In practically all cases the production of HCN is over 90% and even is as high as 96%, the remainder of the nitrogen in the cyanide being converted into other forms which are not poisonous. At higher temperatures, say 35° C., the rate of decomposition is increased but the total amount of HCN evolved is diminished. This is probably caused by the increased decomposition of HCN at the higher temperature.

It will be noted from the above description of my invention that I have provided a simple method of fumigating in which it is merely necessary to provide suitably ground crude cyanides in sealed containers which are shipped to the point of use where they are opened and the material spread either by hand or by suitable machines. I may use an impure crude material and liberate substantially all the nitrogen therein in useful form for gaseous fumigation. The time required for fumigating may be varied by utilizing particles of different sizes and thus the material may be utilized for the extermination of relatively large animals as well as the smaller insects. The residue is non-poisonous making it safe to handle and the poison gas is liberated at the exact point where it is needed in such quantities as not to affect the operator.

I am aware that when sodium cyanide or potassium cyanide is allowed to stand in a closed bottle a small amount of HCN is produced which has been utilized to kill insects, such as butterflies, by placing them in closed bottles of the material until they are poisoned. However, such cyanides cannot be used in my process because the evolution of gas is too slow and the decomposition of the cyanide is incomplete. When an alkali cyanide is exposed to moist air a slight decomposition takes place with the production of caustic soda and HCN which is liberated. The strong alkali thus formed prevents further hydrolysis of the cyanide. In my invention, on the other hand, there is no strong alkali formed in the reaction, and, therefore, it goes to completion rapidly and efficiently.

Although I have described my invention setting forth a single embodiment thereof, various modifications may be made therein as will be appreciated by those skilled in the art. For instance instead of utilizing the above described crude cyanides, I may take an alkali cyanide and fuse the same with an alkali earth chloride such as calcium chloride, grind the mixture and expose to the air. In general, I may use with the cyanide a metal salt which is capable of extracting water from the air, which forms an insoluble hydroxide and the cyanides of which are unstable in aqueous solutions and cannot be recovered therefrom. Among such salts may be mentioned magnesium chloride and many others. I may take a pure alkali earth cyanide, if such was obtainable, either per se or I may mix the same with a substance such as calcium chloride or common salt, which is capable of extracting water from the air and making it available for the above described reaction for the liberation of poisonous gas.

In the claims I have used the term "moist air", but it is to be understood that air is not at all times essential to the operation of my invention as it acts merely as a carrier for the water which causes the desired reaction to take place, and various other inert gases may be substituted therefor or mixed therewith. By the term "in toxic concentrations" I mean concentrations which are toxic to insect and other pests to be exterminated.

What I claim is:

1. A method of fumigating which comprises providing a subdivided mass of a cyanide and a chloride and exposing the same to moist air, whereby the chloride takes up moisture from the air and causes it to hydrolize the cyanide to produce poisonous gas.

2. A method of fumigating which comprises providing a subdivided mass of a cyanide and a chloride and hydrolizing the cyanide and producing poisonous gas, and precipitating a metal hydroxide by exposing the same to moist air.

3. A method of fumigating which comprises providing a subdivided mass of a cyanide and a chloride, and exposing the same to moist air at a relative humidity greater than 30% whereby the chloride takes up moisture from the air and causes it to hydrolize the cyanide to produce poisonous gas.

4. A method of fumigating which comprises producing a subdivided mass of a cyanide and a solid hygroscopic substance and exposing the same to moist air, whereby the hygroscopic substance takes up moisture from the air and causes it to hydrolize the cyanide to produce poisonous gas.

5. A fumigant comprising a mixture containing a moisture decomposable cyanide and a substance capable of attracting moisture for the decomposition of the cyanide.

6. A fumigant comprising a mixture containing a moisture decomposable soluble cyanide and a hygroscopic salt.

7. A fumigant comprising a mixture containing a moisture decomposable alkali earth cyanide and a hygroscopic salt.

8. A fumigant comprising a mass containing cyanide and chlorides of sodium and calcium.

9. A fumigant comprising a mass containing a water decomposable cyanide and a hygroscopic soluble salt of an alkali earth metal.

KENNETH F. COOPER.